United States Patent
Farrugia et al.

(10) Patent No.: US 11,615,388 B2
(45) Date of Patent: *Mar. 28, 2023

(54) DETERMINING VALIDITY OF SUBSCRIPTION TO USE DIGITAL CONTENT

(71) Applicant: Apple Inc., Cupertino, CA (US)

(72) Inventors: Augustin J. Farrugia, Los Altos Hills, CA (US); Gianpaolo Fasoli, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 16/698,621

(22) Filed: Nov. 27, 2019

(65) Prior Publication Data

US 2020/0097638 A1 Mar. 26, 2020

Related U.S. Application Data (63) Continuation of application No. 11/382,469, filed on May 9, 2006, now Pat. No. 10,528,705.

(51) Int. Cl.
*G06Q 20/12* (2012.01)
*G06F 21/10* (2013.01)

(52) U.S. Cl.
CPC ......... *G06Q 20/1235* (2013.01); *G06F 21/10* (2013.01); *G06F 2221/2135* (2013.01); *G06F 2221/2137* (2013.01)

(58) Field of Classification Search
CPC ............. G06F 21/10; G06F 2221/2135; G06F 2221/2137; G06Q 20/1235; G06Q 2220/18; G06Q 2220/10
See application file for complete search history.

(56) References Cited

U.S. PATENT DOCUMENTS

| | | | | |
|---|---|---|---|---|
| 5,579,222 | A | * | 11/1996 | Bains ................... G06Q 30/018 705/16 |
| 5,757,908 | A | | 5/1998 | Cooper et al. |
| 5,883,954 | A | | 3/1999 | Ronning |
| 5,892,900 | A | * | 4/1999 | Ginter ..................... G06F 21/78 726/26 |
| 6,088,693 | A | * | 7/2000 | Van Huben ............ G06F 16/21 |
| 6,098,054 | A | * | 8/2000 | McCollom .............. G06F 21/64 705/51 |
| 6,230,064 | B1 | * | 5/2001 | Nakase .................. G06Q 10/06 715/764 |
| 6,282,175 | B1 | | 8/2001 | Steele et al. |
| 6,393,126 | B1 | | 5/2002 | van der Kaay et al. |

(Continued)

OTHER PUBLICATIONS

Lapin, Lawrence; "Statistics Meanings and Method", 1980, 2nd Edition.*

(Continued)

*Primary Examiner* — Steven S Kim
(74) *Attorney, Agent, or Firm* — BakerHostetler (57) ABSTRACT

Some embodiments provide a method for determining whether a subscription for using digital content on a user device has elapsed. The method compares a first collision free image of a first set of entities in the user device with a second collision free image for a second set of entities in the user device at a second instance in time. Based on the comparison, the method determines whether the subscription has elapsed.

18 Claims, 9 Drawing Sheets

(56) References Cited

U.S. PATENT DOCUMENTS

| | | |
|---|---|---|
| 6,591,377 B1 | 7/2003 | Evoy |
| 7,076,690 B1 | 7/2006 | Stringer |
| 7,092,803 B2* | 8/2006 | Kapolka ............... G06Q 10/08 701/32.4 |
| 7,103,913 B2* | 9/2006 | Arnold ................. G06F 21/566 714/38.11 |
| 7,111,026 B2* | 9/2006 | Sato .................... G06F 16/2308 707/999.203 |
| 7,124,302 B2 | 10/2006 | Ginter et al. |
| 7,287,279 B2 | 10/2007 | Bertman |
| 7,328,453 B2 | 2/2008 | Merkle, Jr. |
| 7,346,585 B1* | 3/2008 | Alabraba .............. G06Q 30/06 705/52 |
| 7,379,600 B2* | 5/2008 | Derks ................. G06F 11/3692 382/218 |
| 7,509,468 B1* | 3/2009 | Dalal ................... G06F 21/562 711/163 |
| 7,512,977 B2* | 3/2009 | Cook ................. H04L 63/1441 726/22 |
| 7,594,271 B2* | 9/2009 | Zhuk ................... G06F 21/121 713/187 |
| 7,627,745 B2 | 12/2009 | Martinez et al. |
| 7,832,012 B2* | 11/2010 | Huddleston ............ G06F 21/53 713/188 |
| 2002/0019814 A1 | 2/2002 | Ganesan |
| 2002/0120465 A1 | 8/2002 | Mori et al. |
| 2002/0157002 A1 | 10/2002 | Messerges et al. |
| 2002/0169974 A1 | 11/2002 | McKune |
| 2003/0037026 A1 | 2/2003 | Bantz et al. |
| 2003/0084344 A1* | 5/2003 | Tarquini .............. H04L 63/1416 726/4 |
| 2003/0145083 A1* | 7/2003 | Cush ................... H04L 41/0853 709/224 |
| 2004/0003267 A1 | 1/2004 | Strom et al. |
| 2004/0010469 A1* | 1/2004 | Lenard ................... G06F 21/10 705/51 |
| 2004/0024688 A1 | 2/2004 | Bi et al. |
| 2004/0054894 A1* | 3/2004 | Lambert ............... G06F 21/126 713/193 |
| 2004/0059813 A1 | 3/2004 | Bolder et al. |
| 2004/0111708 A1* | 6/2004 | Calder ................ G06F 11/3447 717/135 |
| 2004/0186903 A1* | 9/2004 | Lambertz .............. H04L 41/12 709/224 |
| 2004/0187014 A1 | 9/2004 | Molaro |
| 2005/0132122 A1 | 6/2005 | Rozas |
| 2005/0172024 A1* | 8/2005 | Cheifot .................. H04L 61/00 709/225 |
| 2005/0188222 A1 | 8/2005 | Motsinger et al. |
| 2005/0204209 A1 | 9/2005 | Vataja |
| 2005/0289072 A1 | 12/2005 | Sabharwal |
| 2005/0289532 A1* | 12/2005 | Zakon ..................... G06F 8/20 717/165 |
| 2006/0008256 A1 | 1/2006 | Khedouri et al. |
| 2006/0015717 A1 | 1/2006 | Liu et al. |
| 2006/0064762 A1 | 3/2006 | Kayashima et al. |
| 2006/0288424 A1* | 12/2006 | Saito .................. H04N 21/8355 375/E7.009 |
| 2007/0143844 A1 | 6/2007 | Richardson et al. |
| 2007/0168484 A1* | 7/2007 | Koelle .................... G06F 21/56 709/223 |
| 2007/0234070 A1 | 10/2007 | Horning et al. |
| 2007/0261120 A1* | 11/2007 | Arbaugh ................ G06F 21/57 726/26 |
| 2008/0126773 A1 | 5/2008 | Martinez et al. |
| 2009/0193397 A1 | 7/2009 | Chithambaram et al. |
| 2010/0024044 A1* | 1/2010 | Ganesan ................. G06F 21/10 726/27 |

OTHER PUBLICATIONS

Rosenblatt et al., "Digital Rights Managernnt Business and Technology", 2002, M&T Books.*

European Office Action from European Patent Application No. 16158631.8, dated Aug. 24, 2020, 4 pages.

* cited by examiner

515 Selected attributes of the file "WindowsUpdate.log" located in "C:\WINDOWS" folder
- Size: 1,650 KB
- Date Created: 8/11/2004 11:24 AM
- Date Modified: 3/28/2006 11:08 PM
- Date Accessed: 3/28/2006 11:08 AM

525 Selected attributes of the file "Acrobat.EXE" located in "C:\Program Files\Adobe\Acrobat 5.0" folder
- Size: 5,109 KB
- Date Created: 3/22/2001 1:33 PM
- Date Modified: 3/22/2001 1:33 PM
- Date Accessed: 3/31/2006 7:55 PM

535 Statistics for several folders under "C:\Documents and Settings" folder that contain cookies for different users
- Total size: 147,618 bytes
- Total number of objects in folder: 99
- Earliest "Date Created": 2/23/2005 10:07 AM
- Latest "Date Modified": 4/1/2006 10:36 AM
- Latest "Access Date": 4/1/2006 5:18 PM Snapshot taken on 4/1/2006 at 7:32 PM as indicated by the user device clock

520 Selected attributes of the file "WindowsUpdate.log" located in "C:\WINDOWS" folder
- Size: 1,860 KB
- Date Created: 8/11/2004 11:24 AM
- Date Modified: 4/2/2006 10:37 PM
- Date Accessed: 4/2/2006 10:37 AM

530 Selected attributes of the file "Acrobat.EXE" located in "C:\Program Files\Adobe\Acrobat 5.0" folder
- Size: 5,109 KB
- Date Created: 3/22/2001 1:33 PM
- Date Modified: 3/22/2001 1:33 PM
- Date Accessed: 4/5/2006 5:48 PM

540 Statistics for several folders under "C:\Documents and Settings" folder that contain cookies for different users
- Total size: 168,618 bytes
- Total number of objects in folder: 120
- Earliest "Date Created": 2/23/2005 10:07 AM
- Latest "Date Modified": 4/3/2006 1:56 PM
- Latest "Access Date": 4/3/2006 3:03 PM Snapshot taken on 4/3/2006 at 8:56 PM as indicated by the user device clock

DETERMINING VALIDITY OF SUBSCRIPTION TO USE DIGITAL CONTENT

CROSS-REFERENCE TO RELATED APPLICATIONS

The present application is a continuation of U.S. patent application Ser. No. 11/382,469, filed May 9, 2006 and entitled "Determining Validity of Subscription to Use Digital Content," the contents of which is hereby incorporated by reference in its entirety for all purposes.

FIELD OF THE INVENTION

The present invention relates to digital rights management systems and in particular to determining the validity of subscription to use digital content.

BACKGROUND OF THE INVENTION

The protection of digital content transferred between computers is fundamentally important for many enterprises today. Enterprises attempt to secure this protection by implementing some form of Digital Rights Management (DRM) process. DRM refers to a range of techniques that are used to control access to copyrighted content and to enforce the terms and conditions on which the digital content is made available to users. Digital content can be software, music, video, news clip, game, image, or any other content distributed in digital form. Parts of software to implement DRM may run on a server controlled or trusted by the content provider while other parts of the software may be loaded into the user computer either separately or as a part of a platform that allows the user to download and use the content.

Many models have been devised to distribute digital content. In some instances, certain content can be obtained or licensed free. In these instances, the DRM process simply enforces the distribution of content to authorized computers without considering any financial objectives. In other instances, an a la carte download model is used where a user pays a one-time fee to download a particular content. Depending on the terms of use, the user is granted unlimited use, use for a certain period of time, or use for a certain number of times.

Yet, in other instances, a subscription model is used where the user is required to pay a periodic subscription fee. In these instances, as long as the subscription is up-to-date, the user can download an agreed upon (sometimes unlimited) number of content files. The user can also use the content (e.g., listen to a downloaded music track, watch a downloaded movie, play a downloaded game, etc.) as long as the subscription is up-to-date. Therefore, in order to protect the content provider's rights, the DRM process has to be able to determine the validity of subscription when a user wants to use the content.

As long as the user is online, the DRM process can check the validity of the subscription by comparing the expiration time and date of the subscription with the time and date obtained from a trusted source. Once the user goes offline, however, the task of ensuring the validity of the subscription becomes more difficult. When the user is offline, the DRM has to rely on the usually untrusted source of time on the user device. In many operating environments such as Apple Mac OS X® or Microsoft Windows®, a user can easily change the user device system clock. For instance, in order to defeat a DRM system that solely relies on the user device system clock, the user can buy subscription for a limited time, download content, and continue using the downloaded content offline by changing the system clock back to a date and time when the subscription was still valid. There is, therefore, a need in the art to determine whether a user's subscription is still valid without solely relying on the user device clock, especially in environments where the user is not always connected to a DRM enforcing device.

SUMMARY OF THE INVENTION

Some embodiments provide a method for determining whether a subscription for using digital content on a user device has elapsed. The method compares a first collision free image of a first set of entities in the user device with a second collision free image for a second set of entities in the user device at a second instance in time. Based on the comparison, the method determines whether the subscription has elapsed.

In some embodiments, each collision free image includes a slow growth population of entities in the user device, a fast growth population of entities in the user device, and a medium growth population of entities in the user device. In other embodiments, each collision free image includes different types of populations and/or fewer or more types of populations.

In some embodiments, the comparison of the collision free images includes the comparison of a set of attributes of a set of entities in the user device to a set of acceptable operational parameters. In some embodiments, the comparison includes the computation and comparison of statistics calculated for a set of attributes of a set of entities in the user device. Some embodiments at least partly compute the statistics at the time of the generation of the collision free images and/or at the time of the comparison of the collision free images.

Some embodiments provide a digital rights management (DRM) method that compares information for a first set of attributes of the user device at a first instance in time with information of a second set of attributes at a second instance in time. Based on the comparison, the method determines whether the user device environment (e.g., the user device clock, files, directories, etc.) has been manipulated to circumvent DRM protection for accessing a set of content on the user device.

Some embodiments provide a method of distributing digital content. The method distributes content on subscription basis and uses an evolutionary algorithm to determine whether a subscription to use digital content has expired. The method determines whether a population of entities related to a user device has evolved from a previously sampled population. In some embodiments, the method selects the entities and their attributes from a current population based on their fitness, and modifies the selected entities to form a new population for evaluating an evolution for the next generation of said entities.

BRIEF DESCRIPTION OF THE DRAWINGS

The novel features of the invention are set forth in the appended claims. However, for purpose of explanation, several embodiments are set forth in the following figures.

FIG. 5 illustrates examples of two collision free images generated at two different times.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method for determining whether a subscription for using digital content on a user device has elapsed. The method compares a first collision free image of a first set of entities in the user device with a second collision free image for a second set of entities in the user device at a second instance in time. Based on the comparison, the method determines whether the subscription has elapsed.

In some embodiments, each collision free image includes a slow growth population of entities in the user device, a fast growth population of entities in the user device, and a medium growth population of entities in the user device. In other embodiments, each collision free image includes different types of populations and/or fewer or more types of populations.

In some embodiments, the comparison of the collision free images includes the comparison of a set of attributes of a set of entities in the user device to a set of acceptable operational parameters. In some embodiments, the comparison includes the computation and comparison of statistics calculated for a set of attributes of a set of entities in the user device. Some embodiments at least partly compute the statistics at the time of the generation of the collision free images and/or at the time of the comparison of the collision free images.

Some embodiments provide a digital rights management (DRM) method that compares information for a first set of attributes of the user device at a first instance in time with information of a second set of attributes at a second instance in time. Based on the comparison, the method determines whether the user device environment (e.g., the user device clock, files, directories, etc.) has been manipulated to circumvent DRM protection for accessing a set of content on the user device.

Some embodiments provide a method of distributing digital content. The method distributes content on subscription basis and uses an evolutionary algorithm to determine whether a subscription to use digital content has expired. The method determines whether a population of entities related to a user device has evolved from a previously sampled population. In some embodiments, the method selects the entities and their attributes from a current population based on their fitness, and modifies the selected entities to form a new population for evaluating an evolution for the next generation of said entities.

Several more detailed embodiments of the invention are described in sections below. Section I provides an overview of the content-distribution system of some embodiments. This discussion is followed by a discussion of a subscription model used by some embodiments in Section II. Next, Section III describes life cycle analysis that some embodiments use to test the validity of a user subscription. Last, Section IV describes a computer system used by some embodiments of this invention.

I. Overview

Figure 1:
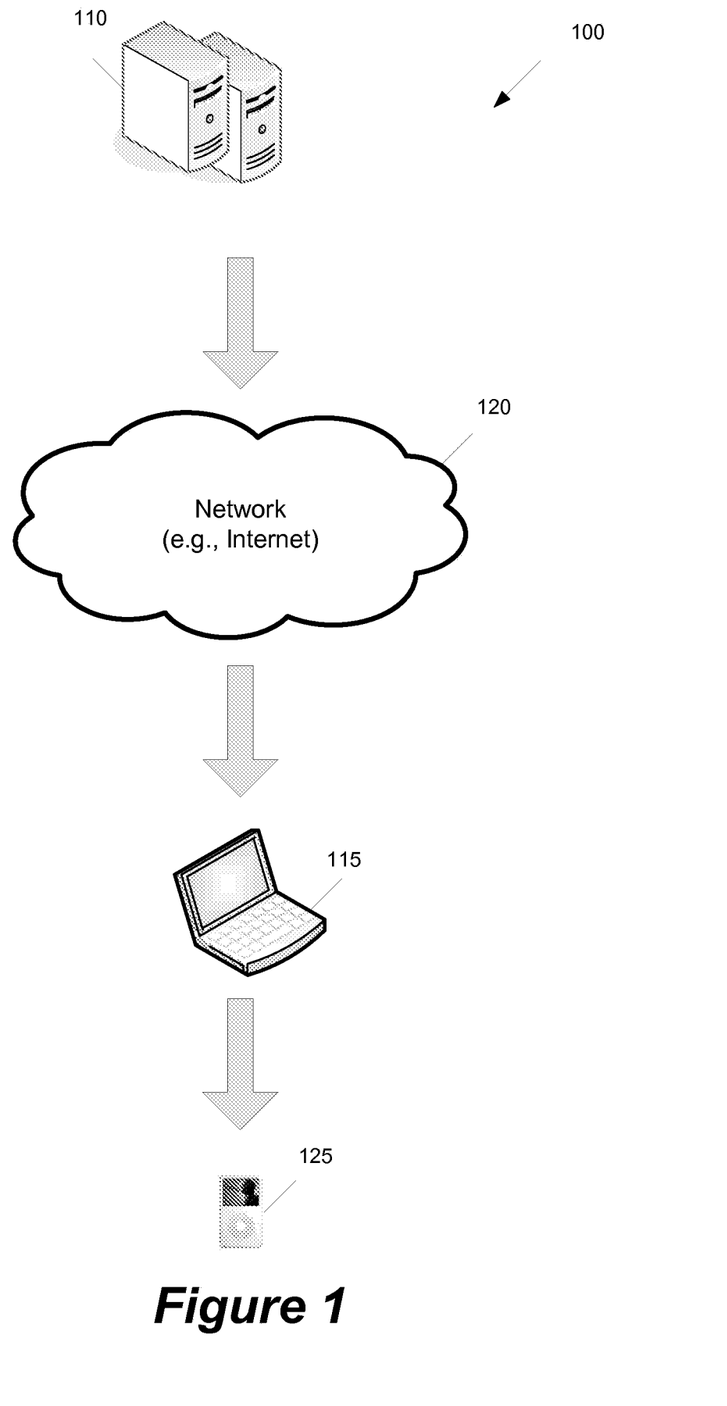
FIG. 1 illustrates a digital-content distribution system of some embodiments.

FIG. 1 illustrates a content-distribution system 100 of some embodiments. This content-distribution system distributes content in a manner that protects the digital rights (i.e., ensures the legal use) of the content. As shown in FIG. 1, the content-distribution system 100 includes a DRM server set 110 and a content-receiving user device 115. Although only one user device 115 is shown in FIG. 1, the content-distribution system 100 can serve many user devices. FIG. 1 illustrates the user device 115 as a portable computer. However, the user device 115 can be a desktop computer, a personal digital assistance (PDA), an audio player, a video player, or any other user device capable of receiving content online. The user device 115 connects to the DRM server set 110 through a computer network 120, such as a local area network, a wide area network, a network of networks (e.g., the Internet), etc.

Through the network connection, the user device 115 communicates with the set of DRM servers 110 to purchase, license, update, or otherwise obtain content in some embodiments. Accordingly, while in some embodiments, the DRM server set 110 sells or licenses content to user devices, this set in other embodiments does not sell or license the content. For instance, in some embodiments, the DRM server set 110 simply enforces the distribution of content to authorized user devices without having any financial objectives.

In some embodiments, the DRM server set 110 includes a content caching server that provides encrypted content to a user device 115 through the network 120, after another server in the DRM server set 110 determines that the user device 115 can obtain content. In some embodiments, the system 100 uses multiple caching servers to cache content at various locations on the network, in order to improve the speed and efficiency of downloading content across the network.

In some embodiments, the downloaded content can be copied from the user device 115 into one or more other user devices. For instance, FIG. 1 illustrates the other user device as a portable media player 125. The portable media player can be any device capable of utilizing the downloaded content. For instance, the portable player could be a music player, a video player, a game box, a camera, etc. In some embodiments, the portable media player can be connected to the user device 115 via a connection such as a Universal Serial Bus (USB), IEEE 1394, infrared, wireless connection, or any other connections known in the art.

Many models have been devised to distribute digital content. In some instances, certain content can be obtained or licensed free. In these instances, the DRM server 110 simply enforces the distribution of content to authorized computers without considering any financial objectives. In other instances, an a la carte download model is used where a user pays a one-time fee to download a particular content. Depending on the terms of use, the user is granted unlimited use, use for a certain period of time, or use for a certain number of times.

Yet, in other instances, a subscription model is used where the user is required to pay a periodic subscription fee. In these instances, as long as the subscription is up-to-date, the user can download an agreed upon (sometimes unlimited) number of content files. The user can also use the content (e.g., listen to a downloaded music track, watch a downloaded movie, play a downloaded game, etc.) as long as the subscription is up-to-date. Therefore, in order to protect the content provider's rights, the DRM process has to be able to determine the validity of subscription when a user wants to use the content.

As long as the user is online, the DRM server set 110 of some embodiments can check the validity of the subscription by comparing the expiration time and/or date of the subscription with the time and/or date obtained from a trusted source. Once the user goes offline, however, the task of ensuring the validity of the subscription relies on the life cycle analysis of some embodiments. Some embodiments rely on the life cycle analysis to determine the validity of a user's subscription even when the user device 115 is connected to the DRM server set 110 directly or through another user device.

II. Subscription Model

A. Subscription Renewal

Figure 2:
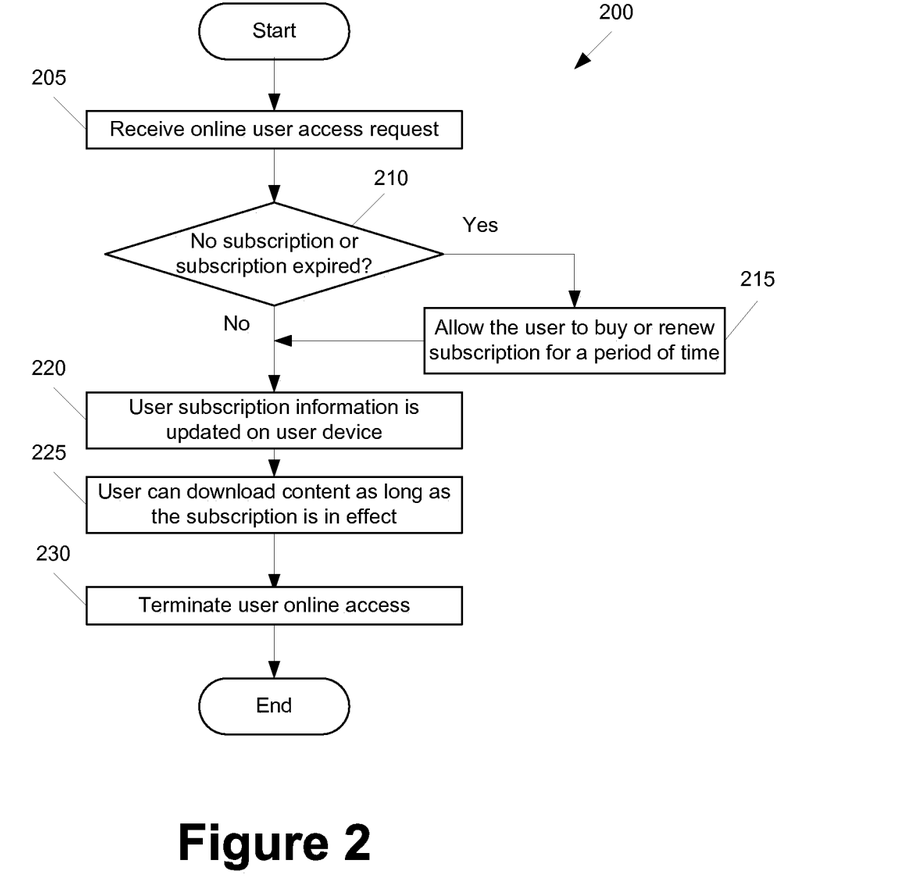
FIG. 2 illustrates subscription renewal process of some embodiments.

As described above, subscription model is used in some content-distribution systems. In order for the owner of the content to be fairly compensated, a process for ensuring the validity of the subscription is required. FIG. 2 conceptually illustrates a subscription renewal process of some embodiments. As shown in FIG. 2, after the user goes online (at 205), the process determines (at 210) whether the user has no subscription or has an expired subscription.

If the user has a valid subscription, the process proceeds to 220 which is described below. On the other hand, if the user does not have a valid subscription, the process guides the user (at 215) to buy or renew subscription for a period of time. Next (at 220), the process updates the user subscription information on the user device 115. At this point, the subscription information on the user device 115 is synchronized with the information on the DRM server 110. As long as the user has a valid subscription, the user can download (at 225) the agreed upon number of content into the user device 115. While the user is online, some embodiments verify the validity of the subscription by using a trusted source of time. After the user goes offline (at 230), however, the DRM module running on the user device uses the life cycle analysis of some embodiments to make sure the subscription to use the digital content has not expired.

B. Subscription Validity Check with the Life Cycle Analysis

In order to determine whether the time indicated by the user device has been tampered with or whether the user environment has been maliciously manipulated, some embodiments implement a technique to perform a life cycle analysis on the user device. The life cycle analysis can be performed both on a user device (e.g., user device 115) that directly connects to the DRM server set through the network as well as a user device (e.g., the user device 125) that connects to the DRM server set through other user devices.

The life cycle analysis is performed on a user device by the user device. To perform the life cycle analysis, several groups of files, file folders, directories, volumes, or any other user device entities with known or predictable behaviors are selected and analyzed. Periodically, a snapshot of certain attributes of these entities (e.g., last access date of a file, creation date of a file, size of a folder, etc.) are taken and saved. Some embodiments calculate statistics for some the attributes and save these calculations. The evolution of these populations, for instance changes in the attributes as well as absence or presence of certain files or directories, is then analyzed to determine whether the observed changes between two snapshots correlate to the elapsed time indicated by the user device system clock.

Figure 3:
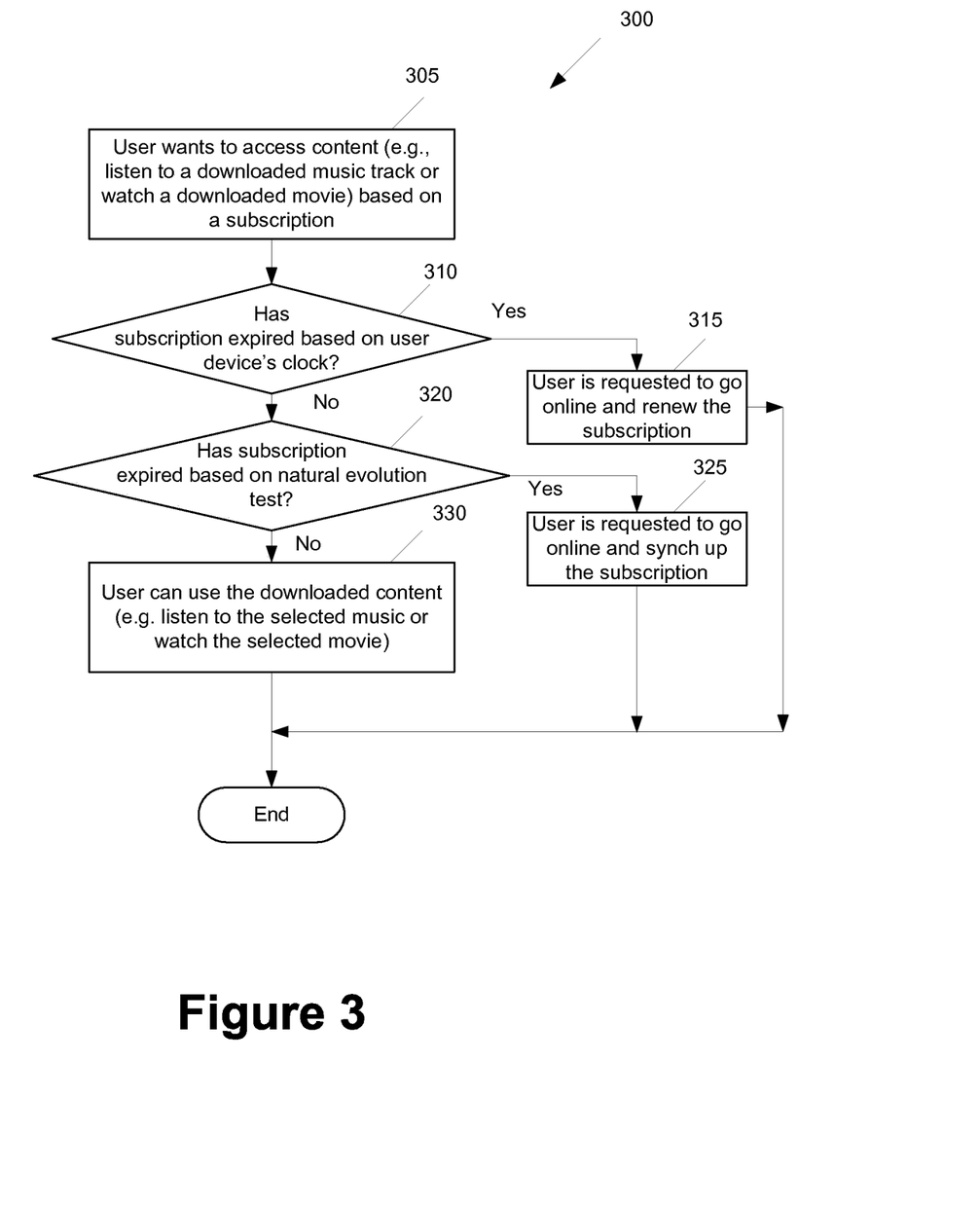
FIG. 3 illustrates a process for subscription validity checking with the life cycle analysis in some embodiments.

FIG. 3 conceptually illustrates the subscription validity checking process 300 of some embodiments. At 305, the process determines that the user wants to use a downloaded content based on the subscription model. For instance, the user might want to listen to a music track, watch a movie, read an article, watch an image, play a game, etc. At 310, the process uses the user device's clock to check if the subscription has expired. If the subscription has expired based on the user clock, the user is requested (at 315) to go online and renew the subscription. Otherwise, the process uses (at 320) a natural evolution test to determine whether the user device clock may have been changed or the user device environment has been manipulated. The details of the natural evolution test are described in the following sections.

If the evolution test determines (at 320) that the user device environment has been manipulated or the user device clock is not reliable (and therefore, the subscription might have expired), the user is requested (at 325) to go online and synch up the subscription with the DRM server set 110. Otherwise, if at 330, the evolution test determines a normal evolution, the user is allowed to use the downloaded content that was obtained through the user's subscription. In some embodiment, the evolution test is done concurrently with the user using the content. In these embodiments (not shown), the user is requested to synch up after the current content is used by the user. In other embodiments, the user is prevented to use the downloaded content until the user synchs up with the DRM server 110.

In the following discussions, the life cycle analysis is described by using several examples. A person of ordinary skill in the art would, however, realize that the invention may be practiced without the use of these specific details. For instance, the life cycle analysis can be performed on any user device (such as personal computers, music players, video players, personal digital assistants, cameras, etc.) that is capable of running software to perform the life cycle analysis and has a set of files or other entities whose attributes can be acquired to do the analysis. Also, the life cycle analysis is not limited to the attributes and file categories shown in the examples and can be practiced using other attributes and other user device entities to do the analysis.

III. Natural Evolution Test

In some embodiments, the life cycle analysis includes a natural evolution test. The natural evolution test is performed by comparing the current snapshot of a population attributes with a previous snapshot of the population attributes to determine of the changes are acceptable. The natural evolution test also ensures that the rest of the user environment has not been modified to mislead the life cycle analysis. Based on the comparison of the current snapshot with the previous snapshot, the natural evolution test determines whether the user device environment has been manipulated to circumvent DRM protection for accessing content on the user device.

As described further below, the populations and their attributes to monitor are selected in a way that no two snapshots can be the same. Each snapshot, therefore, generates a collision free image (CFI) for the selected populations. Some embodiments save certain attributes of the selected populations in the CFI. Some embodiments calculate statistics of certain attributes of different populations and save the statistics in the CFI. In some embodiments, the CFI contains a combination of individual attributes of some population members (e.g., certain attributes of particular files, folders, volumes, etc. that have known behavior) as well as statistics of portions populations as a whole (e.g., average or total size of all files in a certain population). In some embodiments, the CFI also contains name and/or location information to identify each population and its members.

A. The Collision Free Image (CFI)

1. Selection of Populations and Attributes

Some embodiments take snapshots of certain population of files, folders, directories, volumes, or any other entities of a user device hardware or software that has known or predictable behavior and save their attributes (or statistics of those attributes) into a collision free image (CFI). In some embodiments, each snapshot creates a separate CFI.

Selection of these populations (to generate the CFI) depends on the particular user device. Some embodiments make the selection based on the user device environment, e.g., the particular operating system running on the user device, applications running on the user device, as well as the user device hardware configuration. During the development phase of the software that implements the life cycle analysis, the structure, type, attributes, and behaviors of each population are carefully analyzed to determine a set of entities (such as files, folders, directories, volumes, hardware profiles, etc.) with predictable behavior.

Heuristics, trial and errors, as well as study of system description documents and development guides may be used to identify a set of device entities and their specific attributes to be used in the life cycle analysis. Some embodiments identify different groups of entities with similar behavior and make a population from them. For instance, some embodiments identify slow, medium, and fast evolving entities in a user device and allocate them to different populations.

The populations in the user device are analogous to human population. Some human populations, e.g., tribes living in remote areas, change very slowly. In a certain period of time, these tribes have very few people coming and going and have very few births and deaths. On the other hand, in large metropolitan areas, people come and go all the time and there are fairly large number of births and deaths. There are yet other cities or localities with moderate evolutions.

Accordingly, some embodiments analyze three types of populations to create a snapshot of slow evolving population, medium evolving population, and fast evolving population. A person of ordinary skill in the art would realize that the populations of entities in a user device need not be limited to the three mentioned in above example, as additional or fewer levels of granularity can be used. Some of the examples given below, however, use the three categories of slow, medium, and fast evolving population for simplicity.

The natural evolution test of some embodiments implements a genetic algorithm that determines whether a population of entities related to the user device (i.e., entities in the user device or entities in the user device environment, e.g., entities in a local area network connected to the user device) has evolved from a previously sampled population. Genetic algorithms are a particular class of evolutionary algorithms that use techniques inspired by Darwin's theory of evolution such as inheritance, mutation, natural selection, and recombination.

The natural evolution test of these embodiments starts with a certain population. The evolution starts from the first set of entities in the population and evolves in generations. In each generation, the whole population is evaluated to determine if the evolution is reflective of the elapsed time indicated by the user device. In some embodiments, entities and their attributes are selected from the current population based on their fitness, modified (i.e., mutated or recombined) to form a new population for evaluating the evolution of the next generation.

Figure 4:
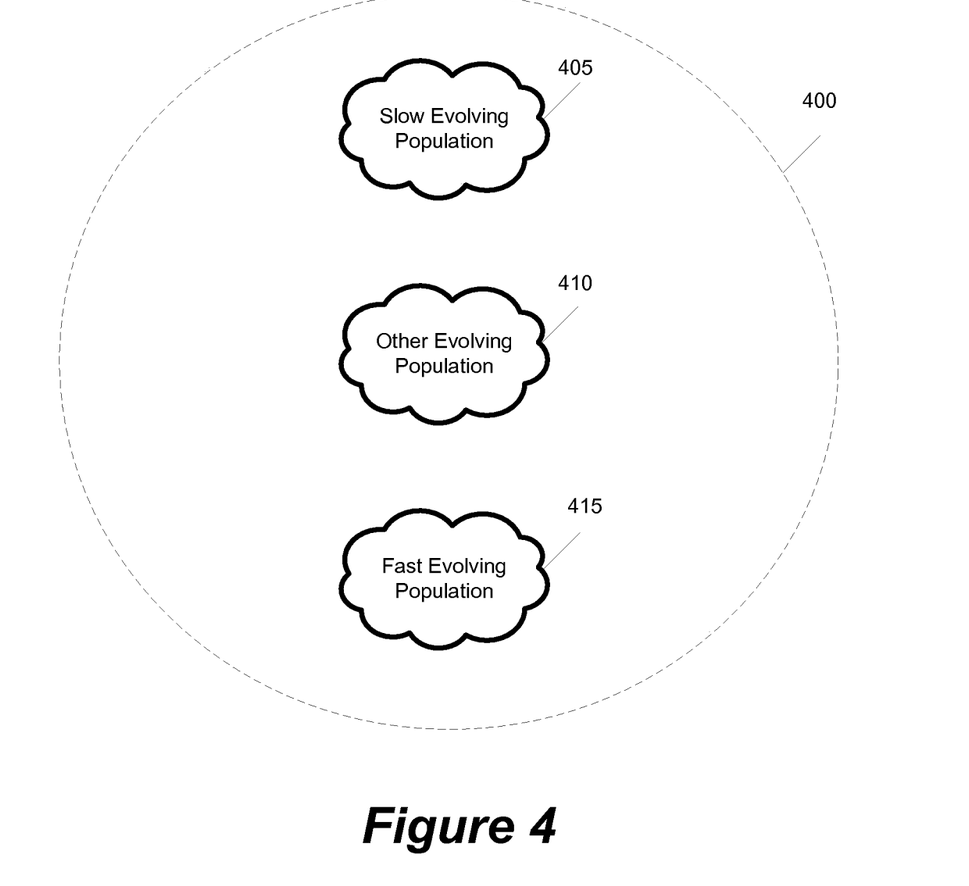
FIG. 4 conceptually illustrates a collision free image that is a snapshot of several populations of files.

FIG. 4 conceptually illustrates a CFI 400 that includes a snapshot of three types of populations 405-415 in a user device. Comparing to human tribes, these populations may be slow evolving, fast evolving or somewhere in between. For instance, in some operating systems, system files and directories make a large population. Although the population may have many members, the population is static except for the last access dates of population members. The user may frequently use the system entities but seldom upgrade or update them.

On the other hand, user files and directories may be a large population with fast evolution. On a daily basis, a user may surf the Internet and add cookies and download files. The user may edit, modify, create, and delete files and directories in the user area. Another example of a population may be a group of applications. In some embodiments, the application files may make a small population that is mainly static. A person of ordinary skill in the art would realize that system, user, and application files and directories are just examples of the entities that have known or predictable behavior.

Once different population and their relevant attributes are determined, heuristics and trial and errors would be used to determine a proper frequency with which snapshots of the populations and their attributes should be taken. The snapshots should be taken with such a frequency to identify expected changes in a user device. For instance, FIG. 5 illustrates an example of two snapshots 505 and 510 of a system taken approximately two days apart. In this figure, the numbers are hypothetical and are used as an example only.

As shown in FIG. 5, the file "WindowsUpdate.log" located in the folder "C:\WINDOWS" is in both CFI (snapshots) 505 and 510. The two snapshots 515 and 520 of this file show that the size of this file has increased from 1,650 kilo bytes (KB) to 1,860 KB in the time the two snapshots were taken. As shown, the "Date Modified" and "Date Accessed" attributes have also changed while the "date Created" attribute has not changed.

Whether or not the two snapshots of this file would pass the evolution test, depends on how the evolution heuristics had expected this file to evolve in the time between the two snapshots. Based on the heuristics, trial and error, information in different system and manufacturer documents, the evolution test would have a predetermined change threshold for different attributes of this file.

For instance, lets assume that based on experimentations, the life cycle analysis has determined that the size of this specific file (which is a system log file) should change by at least 10 kilo bytes (KB) a day and it should be accessed and modified at least once a day. The creation date of the file, however, should not change. Under these assumptions, this specific file would pass the evolution test. Nothing unexpected is detected for this file during the period of approximately two days indicated by the user device clock. On the other hand, if the life cycle analysis had determined that the size of the file should change by at least 150 KB a day, the file would not have passed the evolution test.

The file Acrobat.exe shown in FIG. 5 is another example of a file for which two snapshots 525 and 530 are taken. As shown, this file is located in "C:\Program Files\Adobe\Acrobat 5.0" folder. Let's assume that this is an application file and evolution test does not expect it to change except for the "Date Accessed". As shown in the example, however, the "Date Accessed" attribute of the snapshot taken on Apr. 3, 2006 at 8:56 pm shows a last accessed date of Apr. 5, 2006 at 5:48 PM. This will be an indication to the evolution test that the user device clock that indicates the time of the last snapshot to be Apr. 3, 2006 at 8:56 PM may not have been correct. As was shown in step 325 in FIG. 3, the user will be requested to go online and synch up his/her subscription.

As described above, in some embodiments, the CFI can also contain statistics for all or portions of different populations. The conceptual example shown in FIG. 5 is the two snapshots 535 and 540 taken for a group of folders that contain cookies for different users. In some operating systems, several users may have access to a particular user device and each user may have his/her own assigned area of the memory space (e.g., hard disk) for receiving the cookies downloaded to the hard disk while the user is surfing the Internet. In the example shown in 535 and 540 snapshots, the CFI contains statistics about many or all folders in the hard disk that contain user cookies. In other embodiments, not shown, individual folders containing cookies for individual users may be monitored.

As shown, the two snapshots 535 and 540 show that the total size of this population has increased from 147,618 bytes to 168,618 bytes between the two snapshots. Also, the number of objects in the population has changed from 99 to 120. The example also shows that the earliest creation date, the last modification date, and the last access date of the population are also being monitored. As shown, the last "Date Modified" and last "Date Accessed" attributes have changed between the snapshots while the earliest "Date Created" has not changed.

Whether or not the two snapshots 535 and 540 would pass the evolution test, depends on how the life cycle analysis heuristics had expected this population to evolve in the two days, one hour, and 24 minutes elapsed time that the user device clock shows between the two snapshot. As shown the first snapshot was taken on Apr. 1, 2006 at 7:32 PM and the second snapshot was taken on Apr. 3, 2006 at 8:56 PM. Based on the heuristic, trial and error, information in different system and manufacturer documents, the evolution test would have a predetermined change threshold for different attributes of this population.

For instance, lets assume that based on experimentations, the life cycle analysis determines that the size of a specific population that contains cookies should change by at least 5 KB a day but not more than 20 KB a day. Also, let's assume that the life cycle analysis expects that there should at least be 5 new cookies per day, the population should be modified and/or accessed at least once a day and the earliest creation date should not change. Under these assumptions, the two snapshots 535 and 540 would pass the evolution test. There is nothing unexpected that is detected in this population during the period indicated by the user device clock. On the other hand, if the life cycle analysis heuristics had determined that the size of the population should change by at least 15 KB a day, or there should be at least 20 objects a day added to the population, the population would not have passed the evolution test.

The above examples were given using a Microsoft Windows XP Professional® operating system. A person of ordinary skill in the art would realize that other operating systems may have a different files and folder structure, a different nomenclature for their file structure, may have other attributes that can be monitored, etc. In addition, the snapshots may be taken periodically and/or based on certain events (e.g., whenever a user is trying to access a downloaded content or whenever a user has accessed a predetermined number of downloaded content). Also, the thresholds used by the evolution test may have a different granularity than a day or even a certain time period. The thresholds may be based on frequency of access to downloaded content or any other acceptable criteria determined by trial and error, heuristics, etc.

2. Building the CFI

Figure 6:
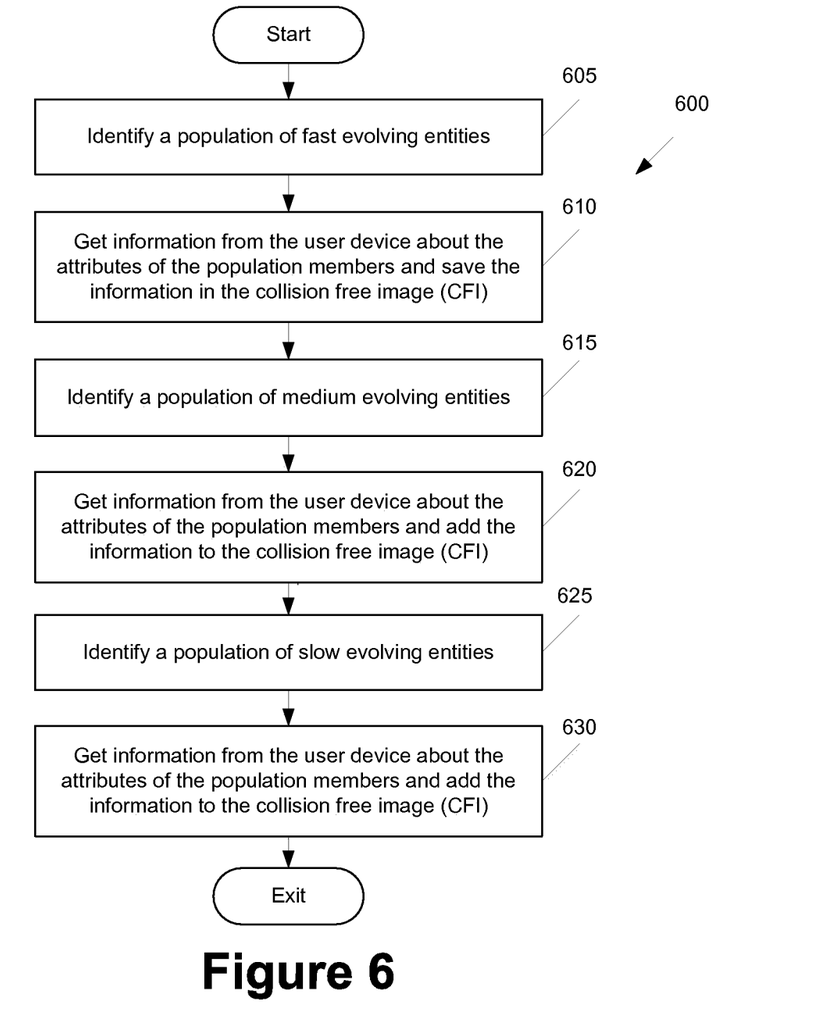
FIG. 6 illustrates a process for building the collision free image used during the natural evolution test in some embodiment.

FIG. 6 illustrates a process 600 for building a collision free image in some embodiments. During the development phase of the life cycle analysis software, some embodiments identify several populations for each type of user device environment. During runtime, the life cycle analysis process selects the populations that are identified for the particular user device type. In some embodiments, the population members are selected before each snapshot is taken. In other embodiments, the population members are selected less frequently.

As shown, the process initially identifies (at 605) a fast evolving population on the user device. The process gets (at 610) information from the user device about the attributes of the population members. As indicated above, examples of some attributes are size, creation date, last modification data, last access date, absence or presence of certain files or directories, etc. In some embodiments, selected attributes of environment in which the user device operates are also included in the CFI. A person of ordinary skill in the art would realize that other attributes may also be used without deviating from the teachings of the invention. The process then saves (at 610) the information in the CFI. The saved information can be the current values of selected attributes of particular files or folders or other entities. The saved information can also be in the form of statistics calculated for certain members of the population. For instance, the statistics may include average, maximum, minimum, mean, standard deviation, or any other statistics calculated for a portion or all members of the population.

Similarly, the process identifies (at 615) a population of medium evolving device entities. At 620, the process gets information from the user device about the attributes of the population members and adds it to the CFI. Similarly, the process identifies (at 625) a population of slow evolving device entities. The process then gets information (at 630) from the user device about the attributes of the population members and adds the information to the CFI. Although the process 600 is shown to identify and collect information for three types of populations, the evolution test is neither limited to three populations nor the populations are solely selection based on how fast they evolve. Therefore, the process 600 may identify several populations based on criteria determined during the development of the evolution phase for the particular user device and use those populations to generate the CFI.

B. Determining if the Evolution Test is Required

In some embodiments, the evolution test is not performed every time a user accesses downloaded content. Different embodiments use different criteria for determining whether the evolution test needs to be performed. For instance, some embodiments may perform the evolution test once out of several times a user accesses any content, once out of several times a user accesses a particular content, randomly, or by any other criteria that is determined during the evolution test development. Some embodiments may use a combination of several criteria to determine whether the evolution test has to be performed. Also as described below, once the evolution test has determined that the user needs to synchronize the subscription, some embodiments set an internal flag that prevents the user to access the content without performing any further evolution tests until the subscription is synchronized.

Figure 7:
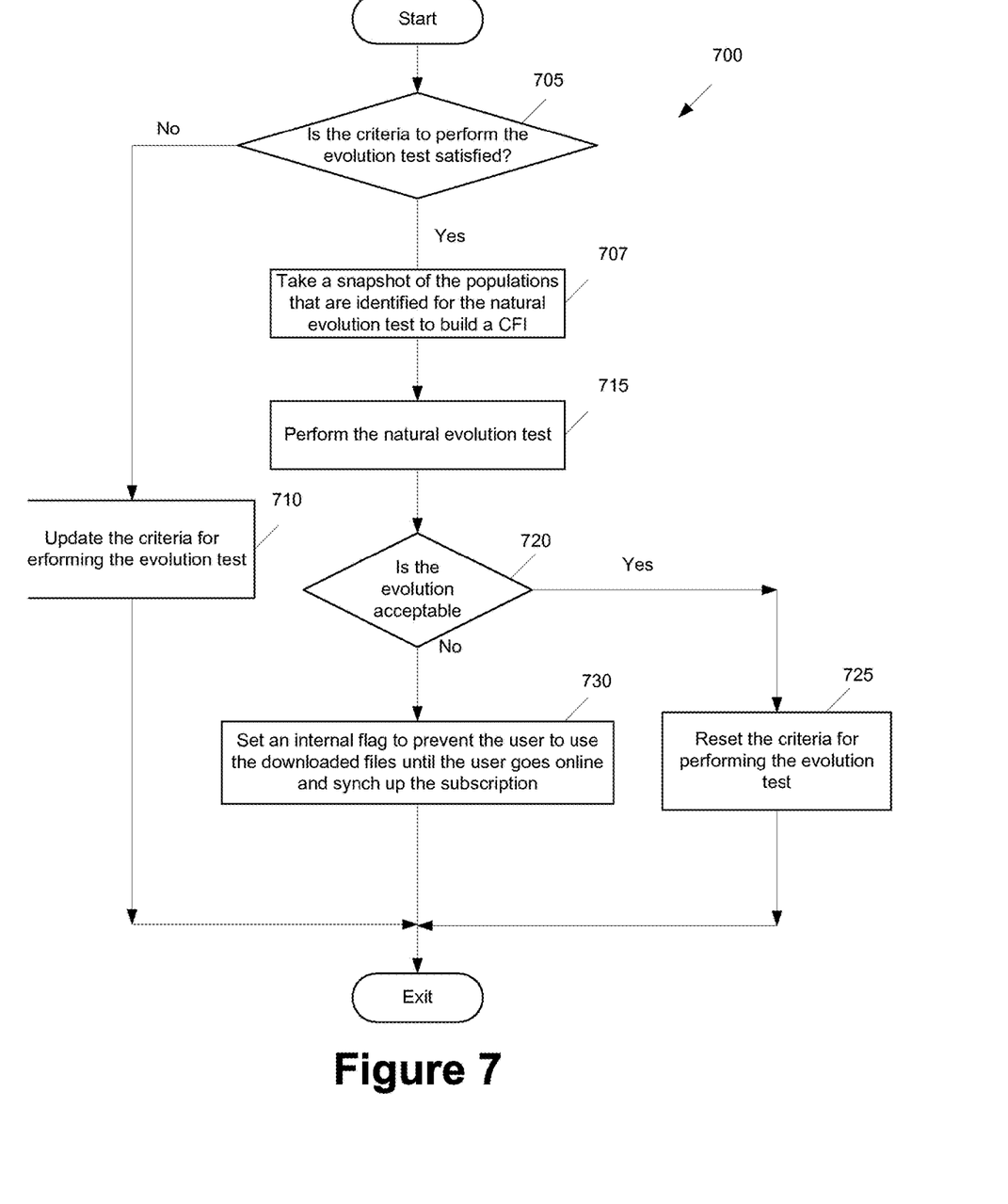
FIG. 7 illustrates a process used in some embodiments to determine if the natural evolution test is required.

FIG. 7 illustrates a process 700 that some embodiments utilize to determine whether the evolution test has to be performed. The process is activated when there may be a need to perform the evolution test. For instance, referring to FIG. 3, the process 700 of some embodiments may be activated before operation 320 is performed. Therefore, in these embodiments, operation 320 (and operation 325 if needed) will only be performed if the process 700 determines that evolution test has to be performed.

As shown in FIG. 7, the process determines (at 705) whether the criteria to perform the evolution test have been satisfied. For instance, if in a particular embodiment, the evolution test is performed every 10 times that the user accesses content that require subscription, the process checks whether the user has already accessed the content at least ten times. If the criteria are not satisfied, the process at 710 updates the criteria, e.g., increments an internal counter, and exits. Otherwise the process builds (at 707) a CFI by taking a snapshot of the populations that are identified for the natural evolution test. Next, the process activates (at 715) the natural evolution test. Details of the evolution test are not shown here but are shown elsewhere in this specification.

At 720, the process checks whether the natural evolution test indicates that the evolution is acceptable. If yes, the process resets (at 725) the criteria for performing the evolution test. The process then exits. Otherwise, the process sets (at 730) an internal flag to prevent the user to use the content that requires subscription to access. This internal flag is reset once the user synchs up the subscription. The process then exits.

C. Type of Tests Performed

Some embodiments perform several tests during the evolution test. Some embodiments perform individual as well of global tests. The individual tests include checking the evolution of the attributes of individual entities (files, folder, volumes, etc.) that have predictable behavior. If any (or a certain number) of these tests fail, the evolution test as a whole would fail.

The global tests include checking statistics for many entities in a population. An example of a global test was described above in reference with snapshots 535 and 540 in FIG. 5. Several global tests can be performed on different groups of entities in a population. If any (or a certain number) of these tests fail, the evolution test as a whole would fail. Some embodiments perform a global evolution test for a set of entities by comparing a weighted computation (e.g., a weighted sum) of the changes in a set of attributes of the set of entities with a threshold to determine whether the set of entities passes the global evolution test. For instance, the following equation (A) shows a weighted sum of the changes in the set of n attributes (size of files, directories, etc.) of a set of entities:

$$\sum_{i=1}^{n} w_i * \Delta_i \quad (A)$$

where n is the number of attributes of the set of entities, $\Delta_i$ is the amount the ith attribute changed and $w_i$ is the weight given to the change of the ith attribute. This weighted sum is then compared with a predetermined threshold. For some global tests, two thresholds may be used to compare the changes to a range with a lower and a higher acceptable threshold.

Figure 8:
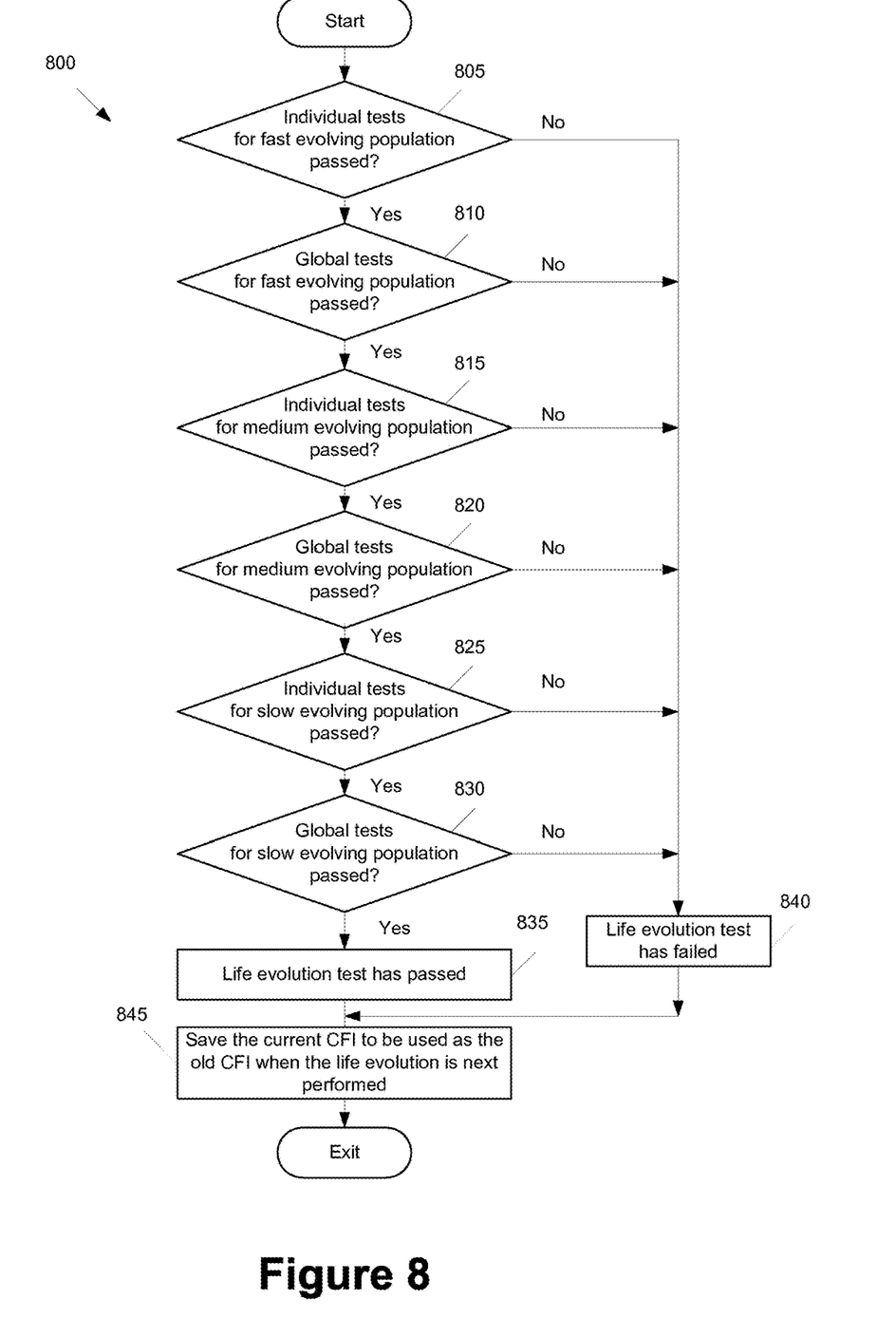
FIG. 8 illustrates different tests performed during the natural evolution test in some embodiments.

FIG. 8 conceptually illustrates a process 800 that performs several different tests during one episode of evolution test. Although the example of FIG. 8 is shown with three populations, the evolution test can be performed with any number of populations. Also, to better illustrate the concept of different tests performed, FIG. 8 only shows the operations that determine whether each group of tests has passed. The other details of the evolution tests, such as the operations of performing the tests are not shown for simplicity.

At 805, the process checks whether the individual tests for the fast evolving population have passed. If these tests fail, the process proceeds to 840 to indicate that the evolution test has failed. The process then transitions to 845 which is further described below. Otherwise, the process checks (at 810) whether the global tests for the fast evolving tests have passed. If these tests fail, the process proceeds to 840 to indicate that the evolution test has failed.

Otherwise, the process checks (at 815) whether all individual tests for the medium evolving population have passed. If these tests fail, the process proceeds to 840 to indicate that the evolution test has failed. Otherwise, the process checks (at 820) whether the global tests for the medium evolving tests have passed. If these tests fail, the process proceeds to 840 to indicate that the evolution test has failed.

Otherwise, at 825 the process checks whether all individual tests for the slow evolving population have passed. If these tests fail, the process proceeds to 840 to indicate that the evolution test has failed. Otherwise, the process checks (at 830) whether the global tests for the slow evolving tests have passed. If these tests fail, the process proceeds to 840 to indicate that the evolution test has failed.

Finally, if all tests have passed, the process proceeds to 835 to indicate that the evolution test has passed. The process saves (at 845) the current CFI to be used as the old snapshot when the evolution test is next performed. The process then exits. Although the example in FIG. 8 shows that both individual tests and global tests are performed for each population, in some embodiments, for certain populations the tests may be limited to either individual or global tests.

IV. Computer System

Figure 9:
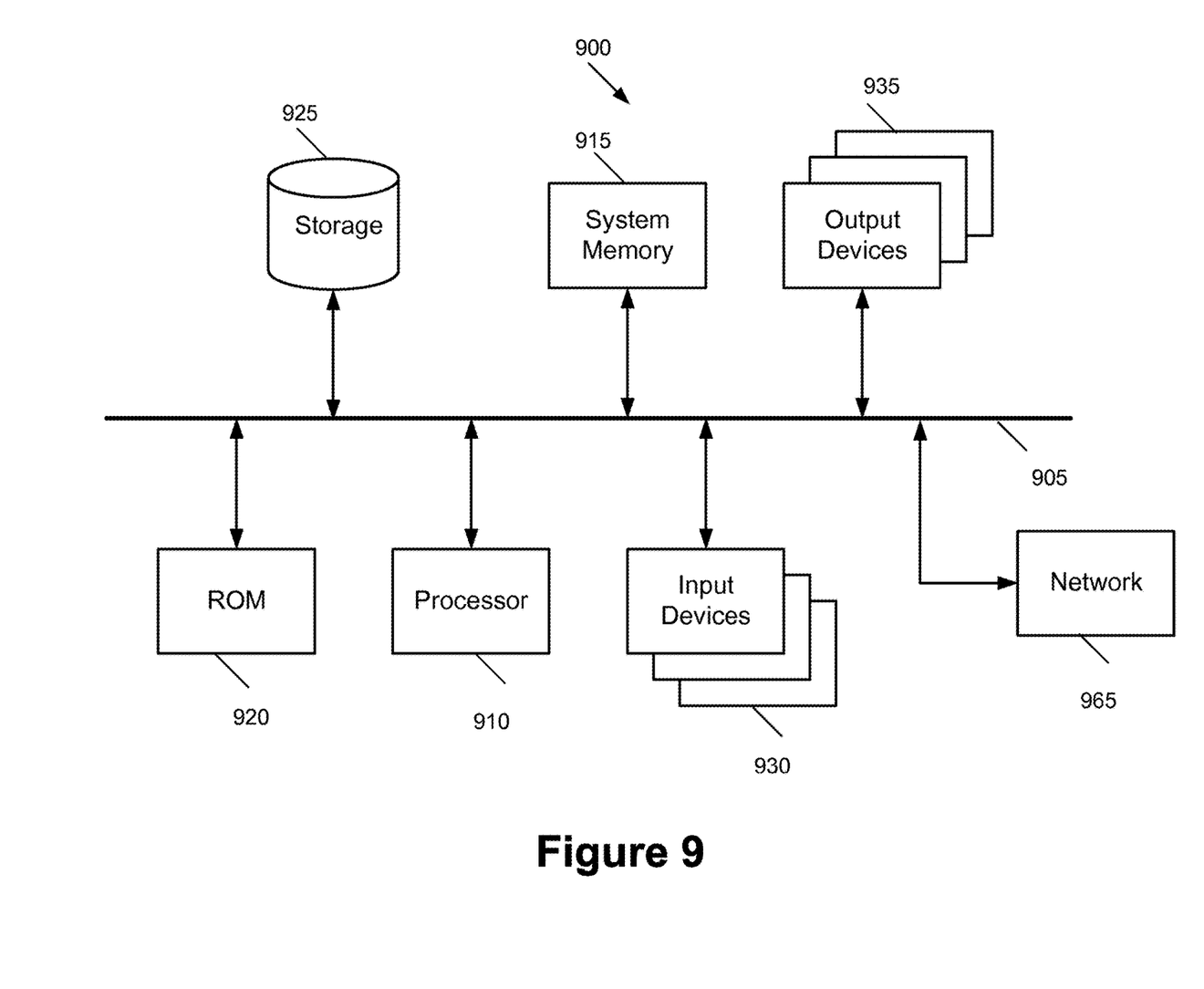
FIG. 9 conceptually illustrates a computer system with which some embodiments are implemented.

FIG. 9 conceptually illustrates a computer system with which some embodiments of the invention are implemented. The computer system 900 includes a bus 905, a processor 910, a system memory 915, a read-only memory 920, a permanent storage device 925, input devices 930, and output devices 935.

The bus 905 collectively represents all system, peripheral, and chipset buses that support communication among internal devices of the computer system 900. For instance, the bus 905 communicatively connects the processor 910 with the read-only memory 920, the system memory 915, and the permanent storage device 925.

From these various memory units, the processor 910 retrieves instructions to execute and data to process in order to execute the processes of the invention. The read-only-memory (ROM) 920 stores static data and instructions that are needed by the processor 910 and other modules of the computer system. The permanent storage device 925, on the other hand, is a read-and-write memory device. This device is a non-volatile memory unit that stores instruction and data even when the computer system 900 is off. Some embodiments of the invention use a mass-storage device (such as a magnetic or optical disk and its corresponding disk drive) as the permanent storage device 925. Other embodiments use a removable storage device (such as a floppy disk or Zip® disk, and its corresponding disk drive) as the permanent storage device.

Like the permanent storage device 925, the system memory 915 is a read-and-write memory device. However, unlike storage device 925, the system memory is a volatile read-and-write memory, such as a random access memory. The system memory stores some of the instructions and data that the processor needs at runtime.

Instructions and/or data needed to perform processes of some embodiments are stored in the system memory 915, the permanent storage device 925, the read-only memory 920, or any combination of the three. For example, the various memory units may contain instructions for processing multimedia items in accordance with some embodiments. From these various memory units, the processor 910 retrieves instructions to execute and data to process in order to execute the processes of some embodiments.

The bus 905 also connects to the input and output devices 930 and 935. The input devices enable the user to communicate information and select commands to the computer system. The input devices 930 include alphanumeric keyboards and cursor-controllers. The output devices 935 display images generated by the computer system. For instance, these devices display IC design layouts. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet) or a network of networks (such as the Internet). Any or all of the components of computer system 900 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. For instance, the life cycle analysis can be performed on any user device (such as personal computers, music players, video players, personal digital assistants, cameras, etc.) that is capable of running software to perform the life cycle analysis and has a set of files or other entities whose attributes can be acquired to do the test. Also, the life cycle analysis is not limited to the attributes and file categories shown in the examples above and can be practiced using other attributes and other user device entities to do the test. For instance, the populations of entities in a user device need not be limited to the three mentioned in some examples above, as additional or fewer levels of granularity can be used.

In other places, various changes may be made, and equivalents may be substituted for elements described without departing from the true scope of the present invention. For instance, the system, user, and application files and directories where shown as examples of the entities that have known or predictable behavior. Many other entities and populations may be identified for use in the evolution test. For instance, in some embodiments the hardware profile of the user device is also used for the life cycle analysis. Although in the examples above, entities local to the user device were used for the life cycle analysis, in some embodiments, entities in the user device environment including a local area network (LAN) or a wireless LAN (WLAN) are also considered.

Also, the evolution test can be performed in user devices running different operating systems. These operating systems may have a different files and folder structure, a different nomenclature for their file structure, may have other attributes that can be monitored, etc. For instance, some operating systems may use the terms directories and sub-directories while others use the term folders and sub-folders. Also, the computer system shown in FIG. 9 is just an example of many different hardware configurations that a user device can have. For instance, a portable media player may have a different hardware configuration than shown in FIG. 9.

In addition, the snapshots may be taken periodically and/or based on certain events e.g., whenever a user is trying to access a downloaded content or whenever a user has accessed a predetermined number of downloaded content. Also, the evolution test may not be performed at fixed time intervals. Instead, performing the evolution test may be based on the frequency of access to content that require subscription or on any other acceptable criteria determined by trial and error, heuristics, etc. Thus, one of ordinary skill in the art would understand that the invention is not limited by the foregoing illustrative details, but rather is to be defined by the appended claims.

What claimed is:

1. A method comprising:
   receiving, on an electronic device, a request to access content associated with a time-based subscription; and
   in response to determining that a connection between the electronic device and a server corresponding to the time-based subscription is unavailable:
   identifying differences between a plurality of current attributes of the electronic device and a plurality of previous attributes of the electronic device by comparing the plurality of current attributes of the electronic device to the plurality of previous attributes of the electronic device wherein the plurality of previous attributes are those of a previous instance in time, wherein the plurality of current attributes correspond to one or more of: a file, a file folder, a directory, or a volume;
   determining whether the identified differences correlate to an elapsed time indicated by a system clock of the electronic device; and
   based on the determining, either preventing access to the content until a status of the time-based subscription is validated with the server, or allowing access to the content.

2. The method of claim 1, further comprising: when the connection to the server is unavailable, preventing access to the content until the status of the time-based subscription is validated with the server when the comparing provides an indication that the time-based subscription is expired.

3. The method of claim 1, further comprising: when the connection to the server is unavailable, allowing access to the content when the comparing provides an indication that the time-based subscription has not expired.

4. The method of claim 1, wherein the plurality of current attributes comprises statistics calculated for a plurality of entities of the electronic device, and comparing the plurality of current attributes comprises comparing the statistics calculated for the plurality of entities.

5. The method of claim 4, wherein the plurality of entities comprises files and directories of the electronic device.

6. The method of claim 5, wherein the plurality of current attributes comprises at least one of size, creation date, last modification date, last access date, absence, and presence of the files and directories of the electronic device.

7. The method of claim 5, further comprising: when the connection to the server is unavailable, allowing access to the content when the identified differences between the plurality of current attributes and those of the previous instance in time are expected based on an amount of time elapsed between a current time and the previous instance in time.

8. The method of claim 5, further comprising: when the connection to the server is unavailable, preventing access to the content when the identified differences between the plurality of current attributes and those of the previous instance in time are unexpected based on an amount of time elapsed between a current time and the previous instance in time.

9. A device comprising:
a memory; and
at least one processor configured to:
receive a request to access content associated with a time-based subscription;
when a connection between the device and a server is available, validate, via the server, a status of the time-based subscription to allow access to the content; and
when the connection between the device and the server is unavailable:
identify differences between a plurality of current attributes of the device and a plurality of previous attributes of the device by comparing the plurality of current attributes of the device to the plurality of previous attributes of the device wherein the plurality of previous attributes are those of a previous instance in time, wherein the plurality of current attributes correspond to one or more of: a file, a file folder, a directory, or a volume;
determine whether the identified differences correlate to an elapsed time indicated by a system clock of the device; and
based on the determination, either prevent access to the content until the status of the time-based subscription is validated with the server, or allow access to the content.

10. The device of claim 9, wherein the at least one processor is further configured to: when the connection to the server is unavailable: prevent access to the content until the status of the time-based subscription is validated with the server when the compare provides an indication that the time-based subscription is expired; and allow access to the content when the compare provides an indication that the time-based subscription has not expired.

11. The device of claim 9, wherein the plurality of current attributes comprises statistics calculated for a plurality of files and directories of the device, and the compare comprises comparing the statistics calculated for the plurality of files and directories.

12. The device of claim 11, wherein the plurality of current attributes comprise at least one of size, creation date, last modification date, last access date, absence, and presence of the files and directories of the device.

13. The device of claim 9, wherein the at least one processor is further configured to: when the connection to the server is unavailable: allow access to the content when the identified differences between the plurality of current attributes and those of the previous instance in time are expected based on an amount of time elapsed between a current time and the previous instance in time; and prevent access to the content when the identified differences between the plurality of current attributes and those of the previous instance in time are unexpected based on an amount of time elapsed between a current time and the previous instance in time.

14. A computer program product stored in a non-transitory machine-readable medium, the computer program product comprising code that, when executed by one or more processors, causes the one or more processors to perform operations comprising:
receiving, on an electronic device, a request to access content associated with a time-based subscription; and
in response to a determination that a connection between the electronic device and a server corresponding to the time-based subscription is unavailable:
identifying differences between a plurality of current attributes of the electronic device and a plurality of previous attributes of the electronic device by comparing the plurality of current attributes of the electronic device to the plurality of previous attributes of the electronic device wherein the plurality of previous attributes are those of a previous instance in time, wherein the plurality of current attributes correspond to one or more of: a file, a file folder, a directory, or a volume;
determining whether the identified differences correlate to an elapsed time indicated by a system clock of the electronic device; and
based on the determining, either preventing access to the content until a status of the time-based subscription is validated with the server, or allowing access to the content.

15. The computer program product of claim 14, wherein the operations further comprise: when the connection to the server is unavailable: preventing access to the content until the status of the time-based subscription is validated with the server when the compare provides an indication that the time-based subscription is expired; and allowing access to the content when the comparing provides an indication that the time-based subscription has not expired.

16. The computer program product of claim 14, wherein the plurality of current attributes comprises statistics calculated for a plurality of files and directories of the electronic device, the code to compare comprises code to compare the statistics calculated for the plurality of files and directories, and the plurality of current attributes comprise at least one of size, creation date, last modification date, last access date, absence, and presence of the files and directories of the electronic device.

17. The computer program product of claim 14, wherein the operations further comprise: when the connection to the server is unavailable: allowing access to the content when the identified differences between the plurality of current attributes and those of the previous instance in time are expected based on an amount of time elapsed between a current time and the previous instance in time; and preventing access to the content when the identified differences between the plurality of current attributes and those of the previous instance in time are unexpected based on an amount of time elapsed between a current time and the previous instance in time.

18. The computer program product of claim 14, wherein the plurality of current attributes comprises at least one of size, creation date, last modification date, last access date, absence, and presence of the files and directories of the electronic device.

\* \* \* \* \*